US011175992B1

(12) United States Patent
Choi et al.

(10) Patent No.: US 11,175,992 B1
(45) Date of Patent: Nov. 16, 2021

(54) METHOD FOR AUTOMATED FUZZING FOR IOT DEVICE BASED ON AUTOMATED RESET AND APPARATUS USING THE SAME

(71) Applicant: Electronics and Telecommunications Research Institute, Daejeon (KR)

(72) Inventors: Yang-Seo Choi, Daejeon (KR); Gae-Il An, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 17/134,088

(22) Filed: Dec. 24, 2020

(30) Foreign Application Priority Data

Nov. 4, 2020 (KR) .......................... 10-2020-0145990

(51) Int. Cl.
*G06F 11/00* (2006.01)
*G06F 11/14* (2006.01)
*G06F 11/36* (2006.01)

(52) U.S. Cl.
CPC ...... *G06F 11/1441* (2013.01); *G06F 11/3668* (2013.01); *G06F 11/3696* (2013.01); *G06F 2201/805* (2013.01)

(58) Field of Classification Search
CPC ......... G06F 2221/033; G06F 2221/034; G06F 11/1441; G06F 11/3668; G06F 11/3684; G06F 11/3696
See application file for complete search history.

(56) References Cited

U.S. PATENT DOCUMENTS

| 8,549,491 | B2 | 10/2013 | Chun et al. |
| 10,764,319 | B2 | 9/2020 | Dhakshinamoorthy et al. |
| 2005/0229160 | A1* | 10/2005 | Rothman .............. G06F 11/362 |
| | | | 717/124 |
| 2013/0122861 | A1 | 5/2013 | Kim et al. |
| 2020/0210592 | A1* | 7/2020 | Karas .................... G06F 21/552 |

FOREIGN PATENT DOCUMENTS

| CN | 112417461 A | * | 2/2021 |
| KR | 101972825 B1 | | 4/2019 |
| KR | 1020190095574 A | | 8/2019 |
| KR | 102104610 B1 | | 5/2020 |

OTHER PUBLICATIONS

Chen et al., "IoTFuzzer: Discovering Memory Corruptions in IoT Through App-based Fuzzing", Network and Distributed Systems Security Symposium 2018, Feb. 2018 (Year: 2018).*
Gui et al., "FIRMCORN: Vulnerbility-Oriented Fuzzing of IoT Firmware via Optimized Virtual Execution", IEEE Access, vol. 8, 2020, Feb. 10, 2020, pp. 29826-29841 (Year: 2020).*

* cited by examiner

*Primary Examiner* — Michael Maskulinski
(74) *Attorney, Agent, or Firm* — William Park & Associates Ltd.

(57) ABSTRACT

Disclosed herein are a method for automated fuzzing for an IoT device based on automated reset and an apparatus using the same. The method includes loading, by the apparatus, a fuzzing agent into an IoT device based on firmware; monitoring, by the apparatus, the status of processing of fuzzing input by the IoT device based on the fuzzing agent; collecting, by the apparatus, fuzzing data corresponding to occurrence of a crash based on hooking using the fuzzing agent when the crash occurs in the IoT device; and resetting, by the apparatus, the IoT device based on the fuzzing agent.

18 Claims, 11 Drawing Sheets

```
-> taskSpawn("haha",0x37,0x3,0x1000,0x2200000)
taskSpawn("haha",0x37,0x3,0x1000,0x2200000)
value = 32864976 = 0x1f57ad0
->  ------------------------------------
```

GENERAL PURPOSE REGISTER:
- (0x2250000)  R0  ~510
- (0x1f57a50)  R1
- (0x0)        R2
- (0x1)        R3
- (0x2)        R4
- (0x3)        R5
- (0x4)        R6
- (0x5)        R7
- (0x6)        R8
- (0x7)        R9
- (0x0)        R10
- (0x22222210) R11
- (0x2200000)  R12
- (0x0)        R13
- (0x0)        R14
- (0x0)        R15
- (0x0)        R16
- (0x0)        R17
- (0x0)        R18
- (0x0)        R19
- (0x0)        R20
- (0x0)        R21
- (0x0)        R22
- (0x0)        R23
- (0x0)        R24
- (0x0)        R25
- (0x0)        R26
- (0x0)        R27
- (0x0)        R28
- (0x0)        R29
- (0x0)        R30
- (0x0)        R31

SPECIAL PURPOSE REGISTER:
- (0xb032)      MSR(Machine State Register)
- (0x2200050)   LR(Link Register)
- (0x2200000)   CTR(Counter Register)
- (0x2200008)   PC(Program Counter)
- (0x0)         CR(Condition Register)
- (0x0)         XER(fiXed-point Exception Register)
- (0xeeeeeeee)  Spefscr(SPE/embed ded Floating Point status register)

Misc.:
- (0x1f57ad0)   taskID
- [haha]        taskName

FIG. 5

```
-> d[0x2100000] Shared Memory
d 0x2100000          ,510
02100000: 0225 0000  01f5 07a5 0000 0000 0000 0001  *.%...zP........*
02100010: 0000 0002  0000 0003 0000 0004 0000 0005  *...............*
02100020: 0000 0006  0000 0007 0000 0000 2222 2210  *............""".*
02100030: 0220 0000  0000 0000 0000 0000 0000 0000  *. .............*
02100040: 0000 0000  0000 0000 0000 0000 0000 0000  *................*
02100050: 0000 0000  0000 0000 0000 0000 0000 0000  *................*
02100060: 0000 0000  0000 0000 0000 0000 0000 0000  *................*
02100070: 0000 0000  0000 0000 0000 0000 0000 0000  *................*
02100080: 0000 b032  0220 0050 0225 0000 0225 0008  *...2. .P.%...%..*
02100090: 0000 0000  0000 0000 eeee eeee 01f5 7ad0  *...............*
021000a0: 6861 6861  0000 0000 0000 0000 0000 0000  *haha............*
021000b0: 0000 0000  0000 0000 0000 0000 0000 0000  *................*
021000c0: 0000 0000  0000 0000 0000 0000 0000 0000  *................*
021000d0: 0000 eeee  0000 0000 0000 0000 0000 0000  *................*
021000e0: 0000 0000  0000 0000 0000 0000 0000 0000  *................*
021000f0: 0000 0000  0000 0000 0000 0000 0000 0000  *................*
Value = 21 = 0x15
->
```

FIG. 6

METHOD FOR AUTOMATED FUZZING FOR IOT DEVICE BASED ON AUTOMATED RESET AND APPARATUS USING THE SAME

CROSS REFERENCE TO RELATED APPLICATION

This application claims the benefit of Korean Patent Application No. 10-2020-0145990, filed Nov. 4, 2020, which is hereby incorporated by reference in its entirety into this application.

BACKGROUND OF THE INVENTION

1. Technical Field

The present invention relates generally to technology for automated fuzzing for an IoT device based on firmware, and more particularly to technology for performing automated fuzzing by detecting a crash arising from fuzzing input in an IoT device in which it is difficult to check a device state and perform an initialization process due to an operating system (OS) and applications running in the form of firmware.

2. Description of the Related Art

'Fuzzing' is a technique for discovering a vulnerability that is unknown although it is present in specific software, and is configured to provide arbitrary input to software and analyze the operation or response of the software in handling the input or the result of processing the input by the software, thereby checking whether a vulnerability is present in the software.

These days, fuzzing is used in order to detect various forms of vulnerabilities in advance and correct the same before an incident occurs. Here, the target software for which fuzzing is to be performed may be any of various types of software, including general applications and firmware.

Generally, when fuzzing is performed, whether an error or a crash occurs is checked through an automated monitoring method. However, when it is difficult to construct an environment for automated monitoring, it is required to manually check the state of fuzzing target software, which significantly increases the amount of time consumed for fuzzing.

For example, when a target program for which fuzzing is to be performed is an application running on a general-purpose OS, such as Windows or Linux, the state of the fuzzing target program may be monitored using another application running on the OS. However, in the case of an IoT device, firmware itself plays both OS and application roles, in which case monitoring must be performed using a method different from a general method.

Generally, in the case of an IoT device based on firmware, because malfunction arises from external input, rather than internal violation, a network fuzzing method for delivering external input is attempted.

Fuzzing for such an IoT device is required to be performed to look for a problem with the IoT device itself, rather than to monitor a specific application of the device for a problem and detect vulnerabilities therein, but technology for automatically monitoring firmware of an IoT device is not yet present.

Also, in order to automate a fuzzing process and repeatedly perform the same, it should be possible to initialize software that is the target of fuzzing when it is determined that the corresponding software cannot operate normally due to fuzzing input (that is, in the event of a crash).

Here, an application running on a general-purpose OS can simply be terminated and restarted when a crash occurs therein, but there is no method of automatically resetting or rebooting an IoT device itself.

Firmware is developed in order to perform only a specific function, and it is very difficult to add functions for monitoring the state of an IoT device and automating reset to firmware that has already been developed. Accordingly, fuzzing for most IoT devices is performed using a manual method, in which people monitor an IoT device and in which, when an error occurs, people initialize the IoT device by turning off and turning on the power of the IoT device.

In some IoT devices, performing functions for fuzzing is attempted by including the device itself in a virtualized environment (VMware, QEMU or the like). However, most IoT devices are highly dependent on hardware, and hardware-related processing is very limitedly supported in a virtualized environment. Therefore, it is very difficult to use this technology in practice.

DOCUMENTS OF RELATED ART (Patent Document 1) Korean Patent No. 10-2104610, registered on Apr. 20, 2020 and titled "Fuzzing method and device for detecting network protocol vulnerability".

SUMMARY OF THE INVENTION

An object of the present invention is to provide automated fuzzing technology for an IoT device that operates based on firmware.

Another object of the present invention is to provide technology for automatically performing a fuzzing function that is capable of detecting the occurrence of a crash by monitoring an IoT device, collecting and delivering information related to the occurrence of the crash, and initializing (resetting) the IoT device.

A further object of the present invention is to enable early detection of a vulnerability in an IoT device based on automated fuzzing and to respond thereto, thereby constructing an environment in which the IoT device can be used more securely.

In order to accomplish the above objects, a method for automated fuzzing for an IoT device according to the present invention includes loading, by an apparatus for automated fuzzing for the IoT device, a fuzzing agent into the IoT device based on firmware; monitoring, by the apparatus for automated fuzzing for the IoT device, the status of processing of fuzzing input by the IoT device based on the fuzzing agent; collecting, by the apparatus for automated fuzzing for the IoT device, fuzzing data corresponding to the occurrence of a crash based on hooking using the fuzzing agent when the crash occurs in the IoT device; and resetting, by the apparatus for automated fuzzing for the IoT device, the IoT device based on the fuzzing agent.

Here, collecting the fuzzing data may include detecting, in advance, the location of an exception handler of the IoT device in firmware memory based on firmware information of the IoT device; and hooking exception handling executed in response to the crash in the IoT device based on the location of the exception handler.

Here, hooking the exception handling may be configured to hook an interrupt corresponding to the crash, among multiple interrupts defined in an exception table.

Here, the fuzzing data may include at least one of crash occurrence information and the value of a register of CPU architecture that is used in the IoT device during execution of the exception handling.

Here, the fuzzing agent may be loaded into an available space that is not used in the firmware memory.

Here, the fuzzing agent may be in the form of a binary file compiled appropriately for CPU architecture on which the firmware of the IoT device is run.

Here, the fuzzing agent may be loaded based on at least one of an interface accessible to the firmware memory and the debug port of the IoT device.

Here, the firmware information may be collected based on at least one of information published by the manufacturer of the IoT device and debugging data of the IoT device.

Here, the crash may correspond to a situation in which the firmware of the IoT device is not capable of running normally.

Also, an apparatus for automated fuzzing for an IoT device according to an embodiment of the present invention includes a processor for loading a fuzzing agent into the IoT device based on firmware, monitoring the status of processing of fuzzing input by the IoT device based on the fuzzing agent, collecting fuzzing data corresponding to the occurrence of a crash based on hooking using the fuzzing agent when the crash occurs in the IoT device, and resetting the IoT device based on the fuzzing agent, and memory for storing the fuzzing data.

Here, the processor may detect, in advance, the location of an exception handler of the IoT device in firmware memory based on firmware information of the IoT device, and may hook exception handling executed in response to the crash in the IoT device based on the location of the exception handler.

Here, the processor may hook an interrupt corresponding to the crash, among multiple interrupts defined in an exception table.

Here, the fuzzing data may include at least one of crash occurrence information and the value of a register of CPU architecture that is used in the IoT device during execution of the exception handling.

Here, the fuzzing agent may be loaded into an available space that is not used in the firmware memory.

Here, the fuzzing agent may be in the form of a binary file compiled appropriately for CPU architecture on which the firmware of the IoT device is run.

Here, the fuzzing agent may be loaded based on at least one of an interface accessible to the firmware memory and the debug port of the IoT device.

Here, the firmware information may be collected based on at least one of information published by the manufacturer of the IoT device and debugging data of the IoT device.

Here, the crash may correspond to a situation in which the firmware of the IoT device is not capable of running normally.

BRIEF DESCRIPTION OF THE DRAWINGS

The above and other objects, features and advantages of the present invention will be more clearly understood from the following detailed description, taken in conjunction with the accompanying drawings, in which:

FIGS. 5 to 6 are views illustrating examples of register values collected as fuzzing data according to the present invention;

DESCRIPTION OF THE PREFERRED EMBODIMENTS

Figure 1:
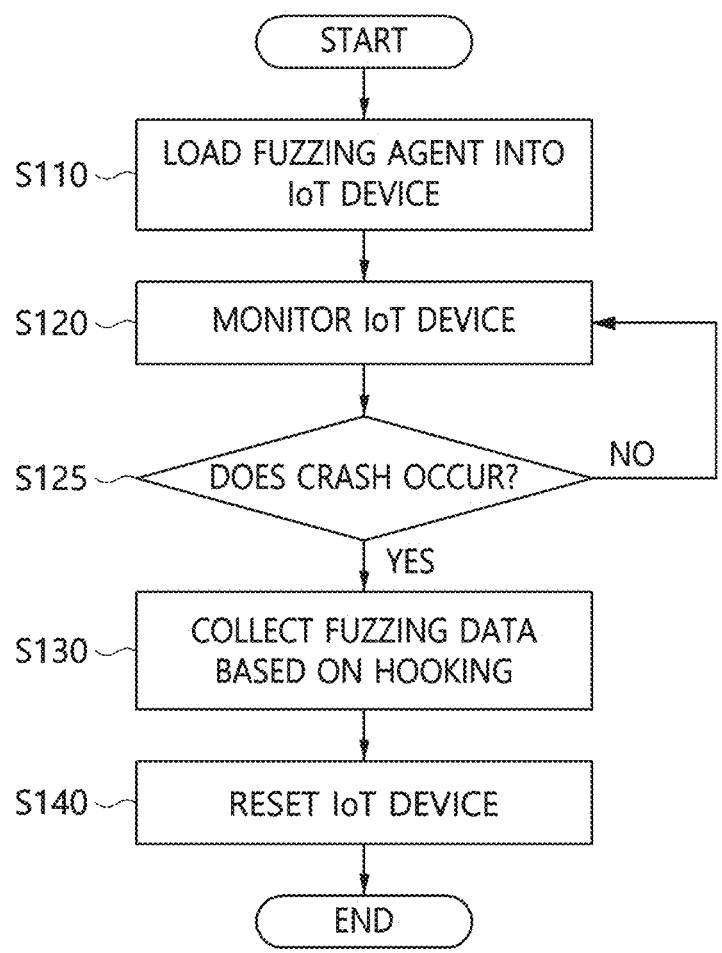
FIG. 1 is a flowchart illustrating a method for automated fuzzing for an IoT device based on automated reset according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

Generally, performing fuzzing for software requires a function of generating the input to be provided to the fuzzing target software, a function of delivering the input to the fuzzing target software, a function of monitoring the status of processing of the input by the fuzzing target software or a result incurred due to the input in the fuzzing target software, and a function of constructing an environment for repeatedly performing a fuzzing process.

Here, when the input to be provided for fuzzing does not comply with the processable format of the fuzzing target software, the case where the corresponding software excludes the input, rather than processing the same, frequently occurs. In this case, fuzzing is not performed, which causes a problem of low effectiveness. In order to prevent this problem, the input to be provided to the fuzzing target software is generated so as to comply with the processable format of the corresponding software.

Also, the result of processing the fuzzing input by the software is monitored, whereby the input causing an error in the corresponding software may be identified and the presence of a vulnerability therein may be recognized.

Here, the error may include all forms of errors, including termination (a crash) of software, which adversely affect the software such that the software, for which fuzzing is performed, is not operated normally.

The present invention intends to propose technology through which automated fuzzing for an Internet-of-Things (IoT) device or Industrial Control System (ICS), which operates based on firmware, can be performed using the above-mentioned functions.

Hereinafter, a description will be made with a focus on IoT devices for convenience of description, but the described technology or configuration may also be applied to and used in ICS-related devices.

FIG. 1 is a flowchart illustrating a method for automated fuzzing for an IoT device based on automated reset according to an embodiment of the present invention.

Referring to FIG. 1, in the method for automated fuzzing for an IoT device based on automated reset according to an embodiment of the present invention, an apparatus for automated fuzzing for an IoT device loads a fuzzing agent into an IoT device based on firmware at step S110.

Here, the fuzzing agent may be a tool developed in order to perform automated fuzzing for an IoT device according to an embodiment of the present invention.

For example, the fuzzing agent may be developed in order to perform a function of monitoring firmware and an initialization (reset) function based on information about the firmware of the IoT device, which is the fuzzing target.

Here, the information about the firmware of the IoT device may be collected based on at least one of information published by the manufacturer of the IoT device and debugging data of the IoT device.

For example, when the manufacturer of the IoT device, which is the fuzzing target, publishes firmware information, the published information may be acquired and used.

When it is difficult to freely acquire information about the firmware of the IoT device, firmware information may be collected using debugging data of the IoT device, which is acquired using an interface accessible to firmware memory of the IoT device, such as a Universal Asynchronous Receiver/Transmitter (UART) or Joint Test Action Group (JTAG) interface.

Generally, in order to use debugging data, information about a chip or memory used in the IoT device is required. Therefore, an interface accessible to the firmware memory of the IoT device, such as a UART or JTAG interface, is provided, and information about the chip or memory used in the IoT device may be acquired using the interface.

Figure 2:
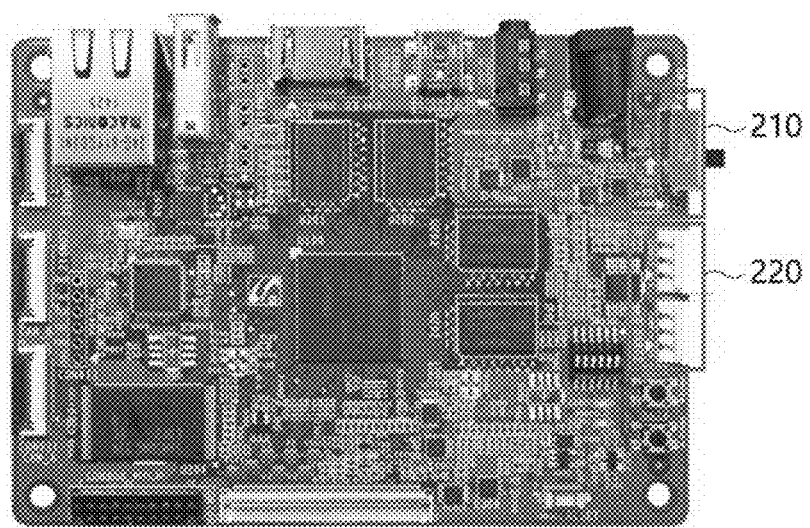
FIG. 2 is a view illustrating an example of a debug port according to the present invention.

Here, the debug ports 210 and 220 illustrated in FIG. 2, such as UART, JTAG and the like, are used for chip-debugging, and are provided in most ICs.

Here, the fuzzing agent may be loaded using at least one of an interface accessible to the firmware memory of the IoT device and the debug port of the IoT device.

Figure 3:
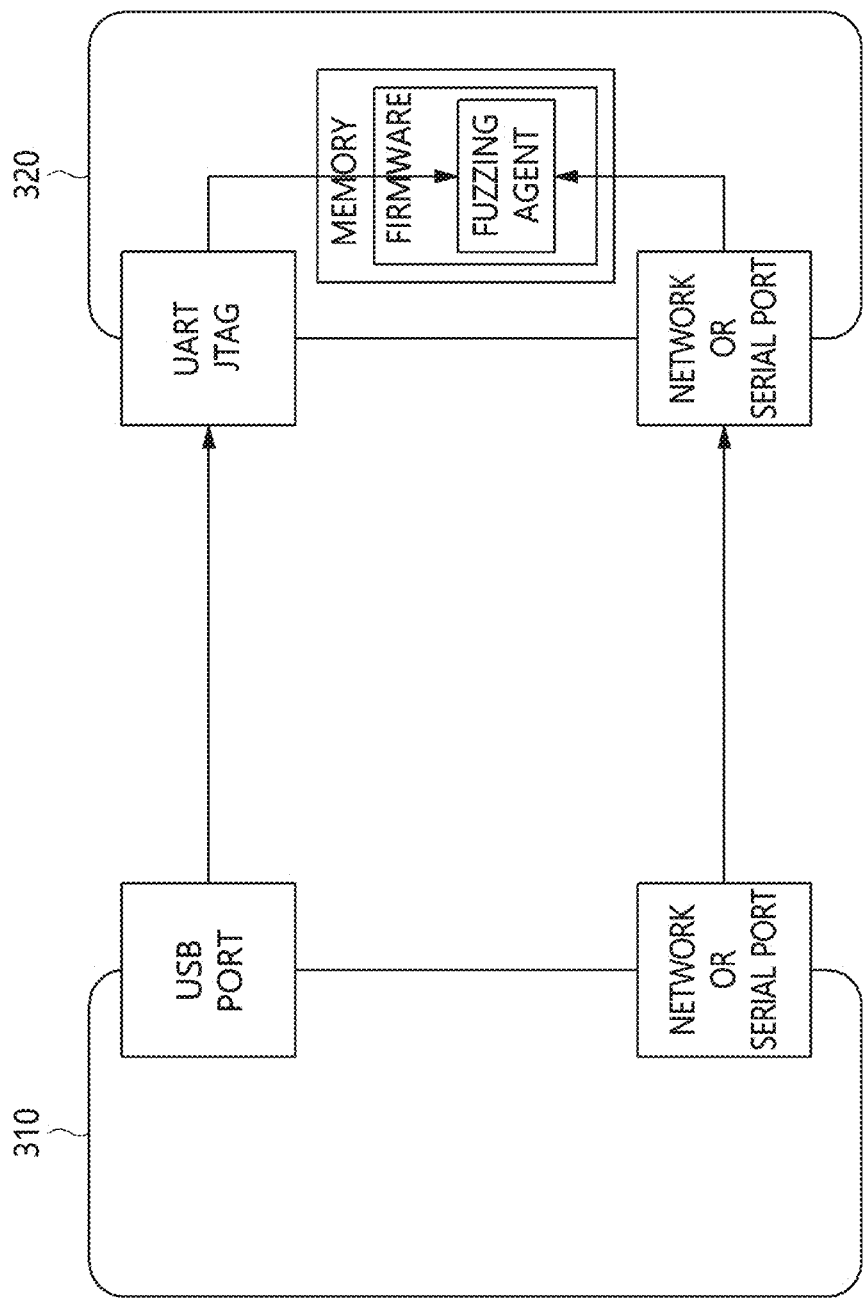
FIG. 3 is a view illustrating the process of loading a fuzzing agent according to an embodiment of the present invention.

For example, referring to FIG. 3, the apparatus 310 for automated fuzzing for an IoT device according to an embodiment of the present invention provides the fuzzing agent through the UART or JTAG of the IoT device 320, which is accessed through the USB port of the apparatus 310, thereby loading the fuzzing agent into the firmware memory of the IoT device 320.

In another example, referring to FIG. 3, the apparatus 310 for automated fuzzing for an IoT device according to an embodiment of the present invention provides the fuzzing agent through the network or serial port of the IoT device 320, which is accessed through the network or serial port of the apparatus 310, thereby loading the fuzzing agent into the firmware memory of the IoT device 320.

Here, the fuzzing agent may be in the form of a binary file compiled appropriately for the CPU architecture on which the firmware of the IoT device is run.

For example, the fuzzing agent may be compiled appropriately for CPU architecture, such as Intel X86, ARM, PowerPC or the like, thereby being generated in the form of binary code.

Here, the fuzzing agent may be configured or generated so as to enable hooking of exception handling in a fuzzing process for the IoT device.

Here, the fuzzing agent may be loaded into available space that is not used in the firmware memory of the IoT device.

For example, after access to the firmware memory through UART or JTAG, the space that is not being used is reserved, and code of the fuzzing agent received from the apparatus for automated fuzzing for an IoT device may be loaded into the reserved space.

Figure 4:
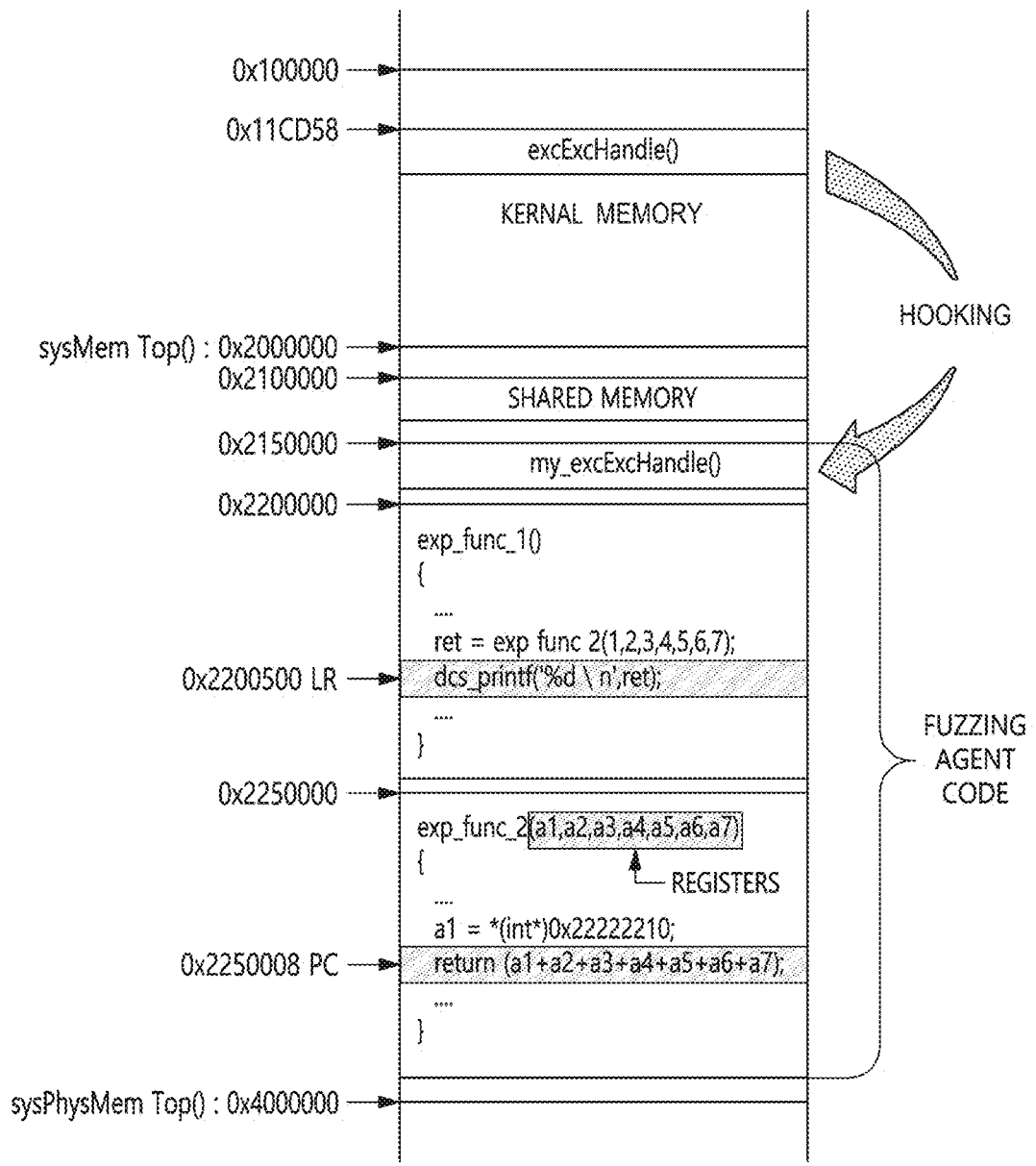
FIG. 4 is a view illustrating an example of a fuzzing agent code memory map according to the present invention.

For example, the fuzzing agent code according to an embodiment of the present invention may be loaded into the firmware memory of the IoT device as illustrated in FIG. 4.

Here, a library included in the firmware of the IoT device is checked, and available functions may be secured.

Also, in order to hook exception handling later, the locations of an exception handler and an exception table may be checked, along with information related thereto.

Here, the fuzzing agent in the form of binary code is loaded, as shown in the example illustrated in FIG. 4, whereby, in the event of an exception during fuzzing for the IoT device, collection and delivery of information related thereto, initialization of the IoT device, and the like may be performed.

Also, in the method for automated fuzzing for an IoT device based on automated reset according to an embodiment of the present invention, the apparatus for automated fuzzing for an IoT device monitors the status of processing of the fuzzing input by the IoT device based on the fuzzing agent at step S120.

Here, the fuzzing agent according to an embodiment of the present invention determines whether a crash occurs in the IoT device by performing monitoring at step S125.

When it is determined at step S125 that a crash occurs in the IoT device, the apparatus for automated fuzzing for an IoT device collects fuzzing data corresponding to the occurrence of the crash based on hooking using the fuzzing agent at step S130.

Here, the crash may be the situation in which the firmware of the IoT device is not capable of running normally.

For example, when the firmware of the IoT device is terminated due to the fuzzing input or when the firmware of the IoT device is no longer run due to an error arising from the fuzzing input, it may be determined that a crash occurs.

Here, the location of the exception handler of the IoT device in the firmware memory may be detected in advance based on the information about the firmware of the IoT device.

For example, reverse engineering analysis is performed on the information about the firmware of the IoT device, whereby the location of the exception handler in the firmware memory of the IoT device may be identified.

Based on the identified location of the exception handler, exception handling executed in response to the crash in the IoT device may be hooked.

Generally, firmware of an IoT device may be designed to, when a crash occurs due to a problem or error in the IoT device, recognize the crash and perform its own exception handling. In the present invention, exception handling internally performed in the IoT device is intercepted, whereby a fuzzing process may be performed.

Particularly, an IoT device or an ICS device is designed such that, when a crash occurs, the device recovers the functions thereof by being initialized as soon as possible in order to sustain the operation for achieving the first intended purpose, and information for processing the same is defined in an exception table.

For example, in preparation for various interrupts capable of occurring in an IoT device, the operation to be performed in response to the occurrence of an interrupt may be previously defined in the exception table.

Accordingly, the present invention may hook an interrupt corresponding to a crash, among the multiple interrupts defined in the exception table.

That is, general exception handling may be designed to actually perform initialization for system function recovery when it is determined that a crash occurs in a system, and in this process, the present invention hooks an interrupt, whereby fuzzing data may be collected before the system is reset.

Here, the fuzzing agent may deliver the collected fuzzing data to the apparatus for automated fuzzing for an IoT device.

Here, the fuzzing data may include at least one of crash occurrence information and the value of a register of CPU architecture that is used in the IoT device during execution of the exception handling.

For example, referring to FIGS. 5 to 6, an arbitrary process is generated in a device that uses VxWorks OS, and the register value 510 used during execution of the corresponding process may be checked by searching a specific area of memory.

Particularly in the corresponding memory, functions of each register may be checked using information provided by VxWorks OS.

For example, a program counter contains information about the location in a program currently being executed, and using the same, the location at which a crash occurs in the program may be identified.

Here, when it is determined at step S125 that no crash occurs in the IoT device, the processing status of the IoT device may be continuously monitored until automated fuzzing for the IoT device is terminated.

Also, in the method for automated fuzzing for an IoT device based on automated reset according to an embodiment of the present invention, the apparatus for automated fuzzing for an IoT device resets the IoT device based on the fuzzing agent at step S140.

Here, fuzzing for the IoT device may be repeatedly performed in an automated manner by resetting the IoT device.

For example, when the reset of the IoT device is completed, the apparatus for automated fuzzing for an IoT device inputs new fuzzing input, which is different from the previous fuzzing input, into the IoT device based on the fuzzing agent and repeatedly performs steps S110 to S140, thereby continually performing automated fuzzing for the IoT device.

Hereinafter, the process of performing fuzzing for an IoT device using a fuzzing agent according to an embodiment of the present invention will be described in detail with reference to FIGS. 7 to 8.

Figure 7:
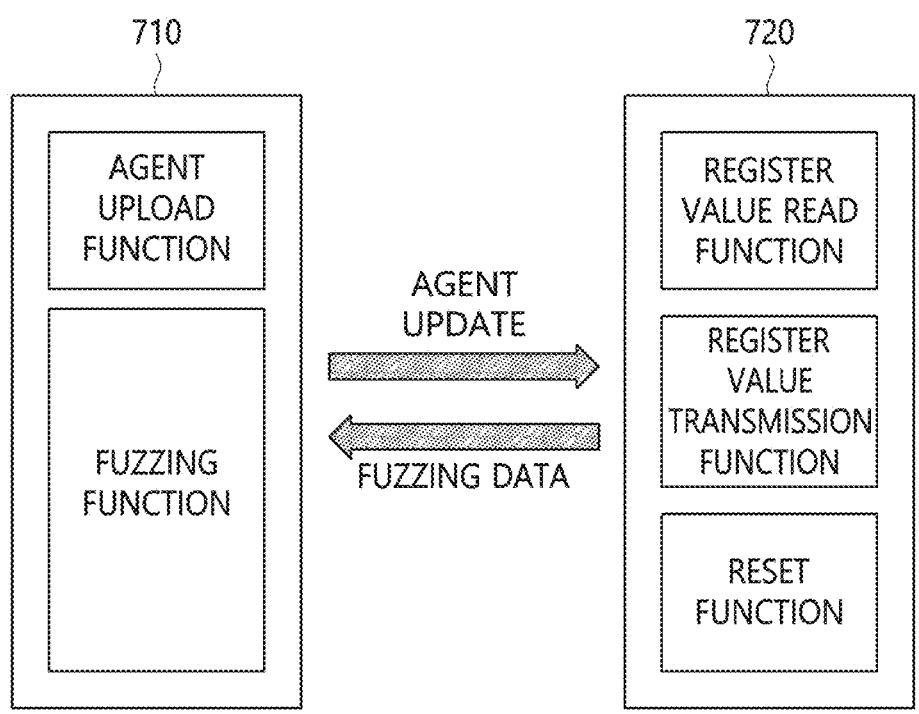
FIG. 7 is a view illustrating an operation between an apparatus for automated fuzzing for an IoT device and a fuzzing agent according to the present invention.
Figure 8:
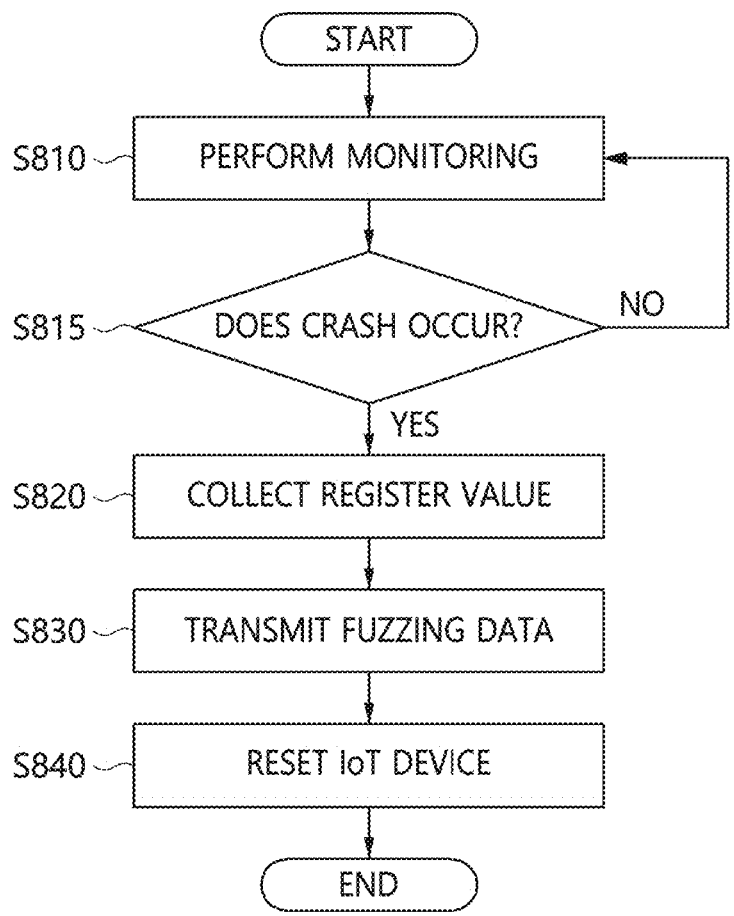
FIG. 8 is a specific flowchart illustrating the process of operation of a fuzzing agent according to an embodiment of the present invention.

First, referring to FIG. 7, the apparatus 710 for automated fuzzing for an IoT device according to an embodiment of the present invention may upload a fuzzing agent 720 into an IoT device using an agent upload function.

The fuzzing agent 720, which is uploaded into the IoT device, monitors the status of processing of fuzzing input by the IoT device at step S810, thereby determining whether a crash occurs at step S815.

When it is determined at step S815 that no crash occurs, monitoring may be repeatedly performed until fuzzing for the IoT device is completed.

Also, when it is determined at step S815 that a crash occurs, the value of a register of CPU architecture that is used during execution of exception handling for responding to the occurrence of the crash in the IoT device may be collected at step S820 based on the register value read function of the fuzzing agent, illustrated in FIG. 7.

Here, the fuzzing agent reads from a register for an instruction pointer (IP) that points to the current instruction being executed in the IoT device, thereby detecting the location at which the crash occurs.

Then, the fuzzing agent may deliver fuzzing data to the apparatus 710 for automated fuzzing for an IoT device at step S830 based on the register value transmission function illustrated in FIG. 7.

Here, the fuzzing data may be delivered over a network, and may include the value of the register, crash occurrence information, the location at which the crash occurs, and the like.

Then, the fuzzing agent may reset the IoT device at step S840 based on the reset function illustrated in FIG. 7 in order to repeatedly perform fuzzing.

Through the above-described method for automated fuzzing for an IoT device, automated fuzzing technology for an IoT device operating based on firmware may be provided.

Also, there may be provided technology for automatically performing a fuzzing function capable of detecting the occurrence of a crash by monitoring an IoT device, collecting and delivering information related to the occurrence of the crash, and initializing (resetting) the IoT device.

Also, a vulnerability in an IoT device may be detected early based on automated fuzzing such that it is possible to respond thereto, whereby an environment in which the IoT device can be used more securely may be constructed.

Figure 9:
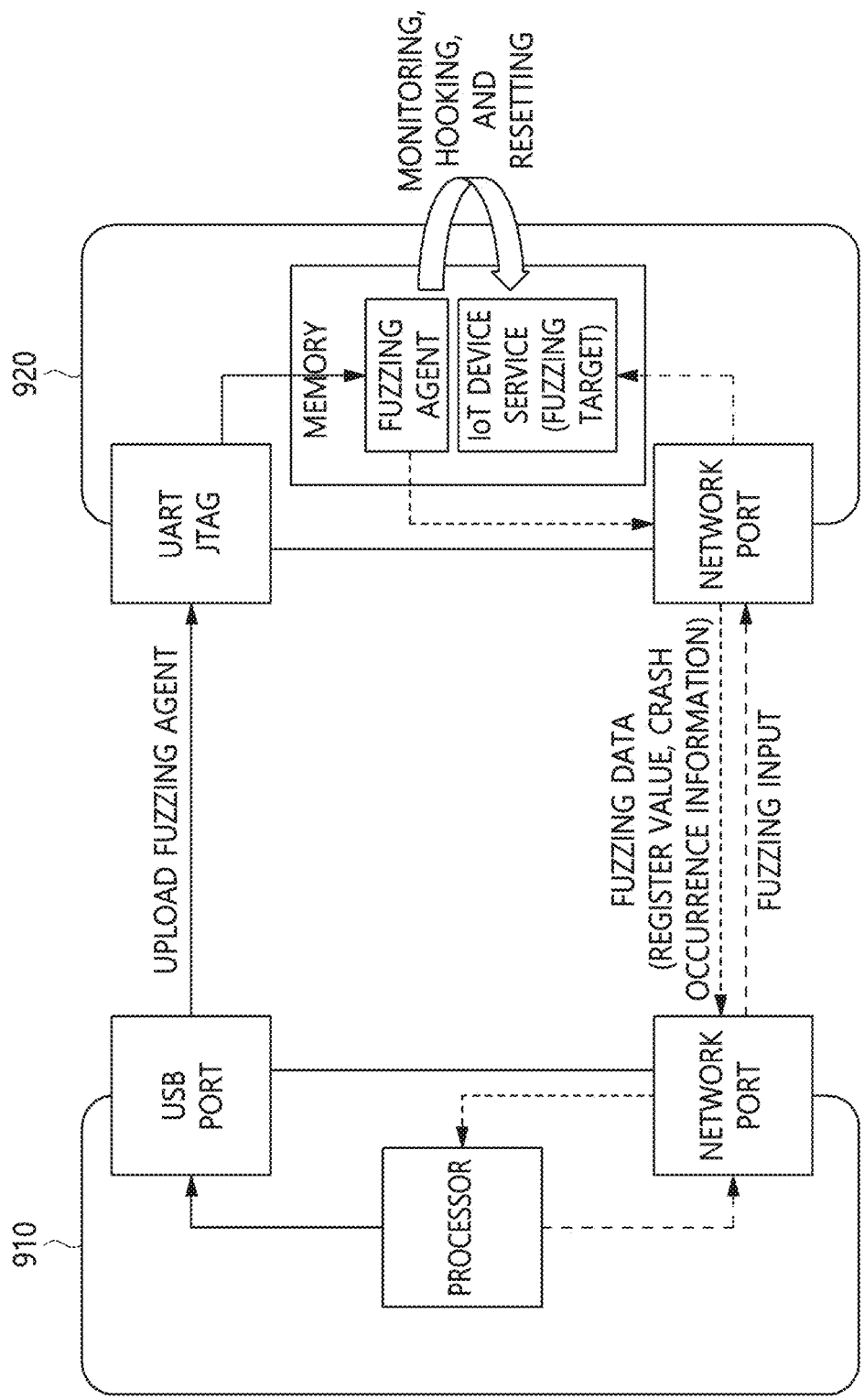
FIG. 9 is a view illustrating an example of an overall fuzzing process according to the present invention.

FIG. 9 is a view illustrating an example of an overall fuzzing process according to the present invention.

Figure 10:
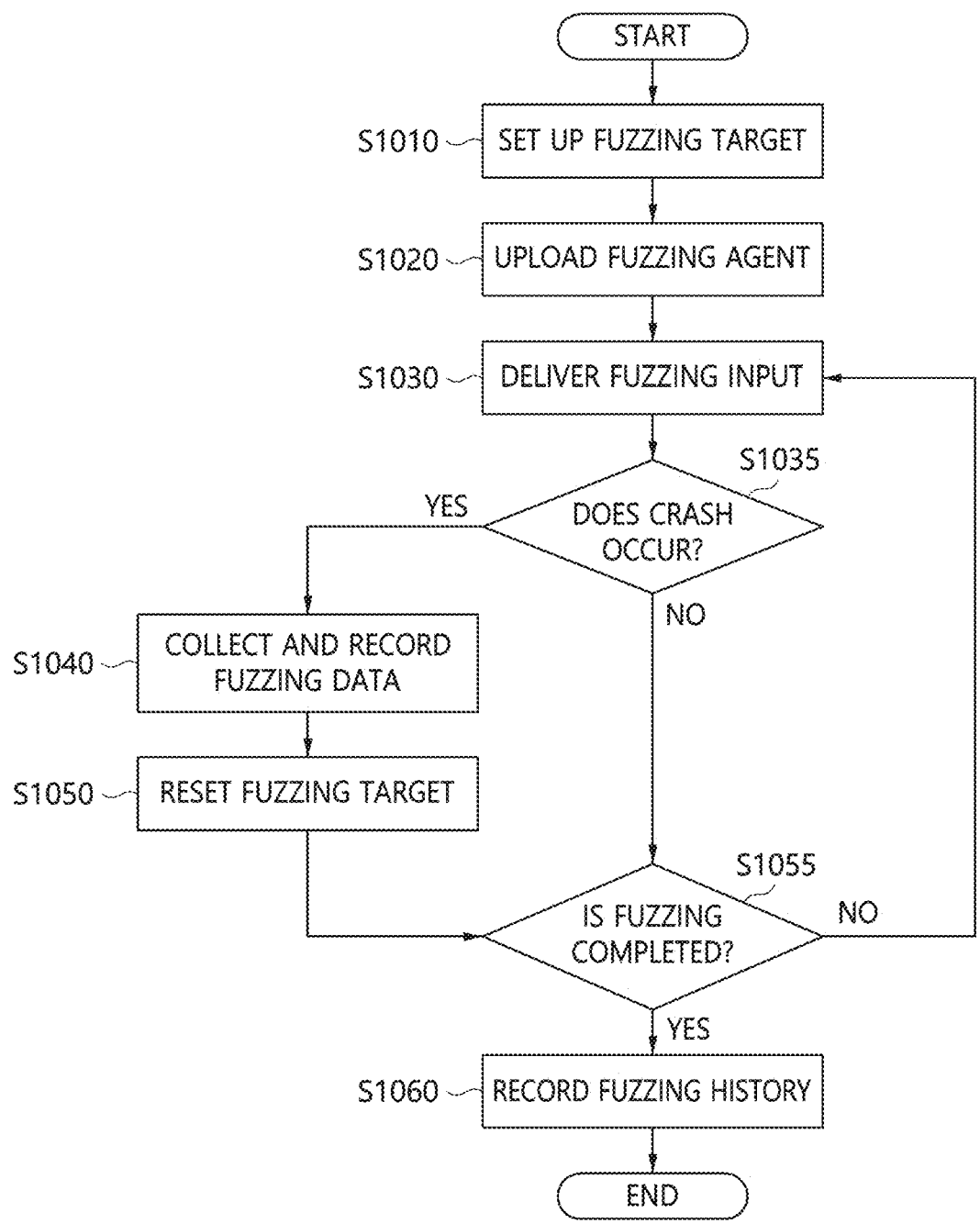
FIG. 10 is a specific flowchart illustrating a method for automated fuzzing for an IoT device according to an embodiment of the present invention.

FIG. 10 is a specific flowchart illustrating a method for automated fuzzing for an IoT device according to an embodiment of the present invention.

Hereinafter, a method for automated fuzzing for an IoT device according to an embodiment of the present invention will be described in detail with reference to FIGS. 9 to 10.

First, the apparatus 910 for automated fuzzing for an IoT device illustrated in FIG. 9 may set up the IoT device 920, which is a fuzzing target, at step S1010, and may then upload a fuzzing agent to the IoT device 920 at step S1020.

For example, the fuzzing agent may be uploaded into the firmware memory of the IoT device 920 through the connection between the USB port of the apparatus 910 for automated fuzzing for an IoT device and the debug port (UART or JTAG) of the IoT device 920 or through the connection between the network ports, as shown in FIG. 9.

Then, the apparatus 910 for automated fuzzing for an IoT device may generate fuzzing input using a processor and deliver the same to the IoT device 920 through the network port at step S1030.

Then, the apparatus 910 for automated fuzzing for an IoT device monitors a process in which the IoT device 920 processes the fuzzing input based on the fuzzing agent loaded into the IoT device 920, thereby determining whether a crash occurs at step S1035.

When it is determined at step S1035 that a crash occurs, the apparatus 910 for automated fuzzing for an IoT device hooks exception handling executed by the IoT device 920 through the fuzzing agent, thereby collecting and recording fuzzing data at step S1040.

Here, the fuzzing agent may deliver the fuzzing data, including the value of a register related to the operation of the IoT device in the event of a crash, crash occurrence information, the location at which the crash occurs, and the like, to the apparatus 910 for automated fuzzing for an IoT device based on the network port of the IoT device 920.

Then, the apparatus 910 for automated fuzzing for an IoT device may reset the IoT device 920 through the fuzzing agent at step S1050, and may determine whether fuzzing for the IoT device 920 is completed at step S1055.

Also, when it is determined at step S1035 that no crash occurs, whether fuzzing for the IoT device 920 is completed may be determined at step S1055.

When it is determined at step S1055 that fuzzing for the IoT device 920 is not completed, the apparatus 910 for automated fuzzing for an IoT device may repeatedly perform the fuzzing process from steps S1030 to S1055 based on the fuzzing agent.

Also, when it is determined at step S1055 that fuzzing for the IoT device 920 is completed, the apparatus 910 for automated fuzzing for an IoT device may record a history of fuzzing for the IoT device 920 in internal memory and terminate fuzzing at step S1060.

Here, FIG. 10 corresponds to an embodiment, and the sequences of the respective steps may be changed depending on the circumstances.

Figure 11:
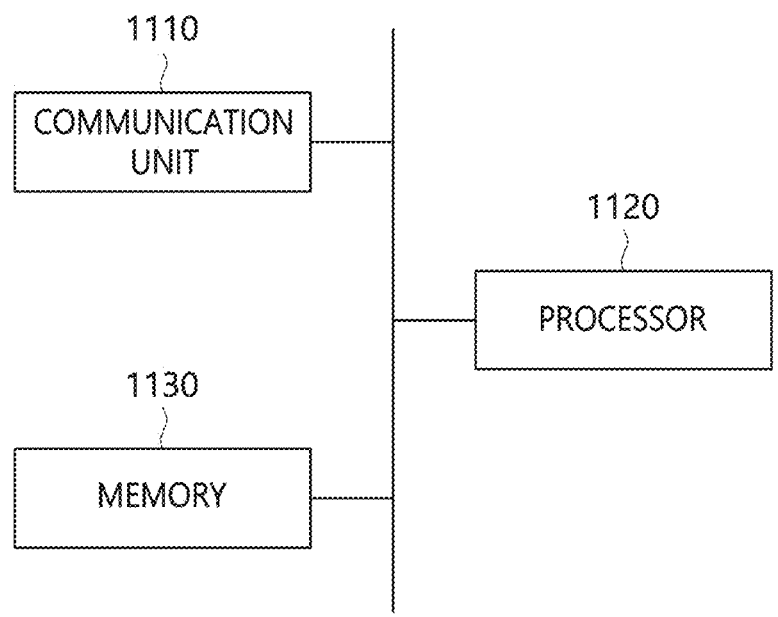
FIG. 11 is a block diagram illustrating an apparatus for automated fuzzing for an IoT device based on automated reset according to an embodiment of the present invention.

FIG. 11 is a block diagram illustrating an apparatus for automated fuzzing for an IoT device based on automated reset according to an embodiment of the present invention.

Referring to FIG. 11, the apparatus for automated fuzzing for an IoT device based on automated reset according to an embodiment of the present invention includes a communication unit 1110, a processor 1120, and memory 1130.

The communication unit 1110 may serve to transmit and receive information required for automated fuzzing for an IoT device through a communication network. Here, the network provides a path through which data is delivered between devices, and may be conceptually understood as including networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured with a combination of one or more of a wired network, a Wireless Broadband (WiBro) network, a 3G mobile communication network including WCDMA, a High-Speed Downlink Packet Access (HSDPA) network, a 3.5G mobile communication network including an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1120 loads a fuzzing agent into an IoT device based on firmware.

Here, the fuzzing agent may be a tool developed in order to perform automated fuzzing for an IoT device according to an embodiment of the present invention.

For example, the fuzzing agent may be developed in order to perform a function of monitoring firmware and an initialization (reset) function based on information about the firmware of the IoT device, which is the fuzzing target.

Here, the information about the firmware of the IoT device may be collected based on at least one of information published by the manufacturer of the IoT device and debugging data of the IoT device.

For example, when the manufacturer of the IoT device, which is the fuzzing target, publishes firmware information, the published information may be acquired and used.

When it is difficult to freely acquire information about the firmware of the IoT device, firmware information may be collected using debugging data of the IoT device, which is acquired using an interface accessible to firmware memory of the IoT device, such as a Universal Asynchronous Receiver/Transmitter (UART) or Joint Test Action Group (JTAG) interface.

Generally, in order to use debugging data, information about a chip or memory used in the IoT device is required. Therefore, an interface accessible to the firmware memory of the IoT device, such as a UART or JTAG interface, is provided, and information about the chip or memory used in the IoT device may be acquired using the interface.

Here, the debug ports 210 and 220 illustrated in FIG. 2, such as UART, JTAG and the like, are used for chip-debugging, and are provided in most ICs.

Here, the fuzzing agent may be loaded using at least one of an interface accessible to the firmware memory of the IoT device and the debug port of the IoT device.

For example, referring to FIG. 3, the apparatus 310 for automated fuzzing for an IoT device according to an embodiment of the present invention provides the fuzzing agent through the UART or JTAG of the IoT device 320, which is accessed through the USB port of the apparatus 310, thereby loading the fuzzing agent into the firmware memory of the IoT device 320.

In another example, referring to FIG. 3, the apparatus 310 for automated fuzzing for an IoT device according to an embodiment of the present invention provides the fuzzing agent through the network or serial port of the IoT device 320, which is accessed through the network or serial port of the apparatus 310, thereby loading the fuzzing agent into the firmware memory of the IoT device 320.

Here, the fuzzing agent may be in the form of a binary file compiled appropriately for the CPU architecture on which the firmware of the IoT device is run.

For example, the fuzzing agent may be compiled appropriately for CPU architecture, such as Intel X86, ARM, PowerPC or the like, thereby being generated in the form of binary code.

Here, the fuzzing agent may be configured or generated so as to enable hooking of exception handling in a fuzzing process for the IoT device.

Here, the fuzzing agent may be loaded into available space that is not used in the firmware memory of the IoT device.

For example, after access to the firmware memory through UART or JTAG, the space that is not being used is reserved, and code of the fuzzing agent received from the apparatus for automated fuzzing for an IoT device may be loaded into the reserved space.

For example, the fuzzing agent code according to an embodiment of the present invention may be loaded into the firmware memory of the IoT device, as illustrated in FIG. 4.

Here, a library included in the firmware of the IoT device is checked, and available functions may be secured.

Also, in order to hook exception handling later, the locations of an exception handler and an exception table may be checked, along with information related thereto.

Here, the fuzzing agent in the form of binary code is loaded, as shown in the example illustrated in FIG. 4, whereby, in the event of an exception during fuzzing for the IoT device, collection and delivery of information related thereto, initialization of the IoT device, and the like may be performed.

Also, the processor 1120 monitors the status of processing of the fuzzing input by the IoT device based on the fuzzing agent.

Also, the processor 1120 determines whether a crash occurs in the IoT device by performing monitoring through the fuzzing agent, and collects fuzzing data corresponding to the occurrence of a crash based on hooking using the fuzzing agent when the crash occurs in the IoT device.

Here, the crash may be the situation in which the firmware of the IoT device is not capable of running normally.

For example, when the firmware of the IoT device is terminated due to the fuzzing input or when the firmware of the IoT device is no longer run due to an error arising from the fuzzing input, it may be determined that a crash occurs.

Here, the location of the exception handler of the IoT device in the firmware memory may be detected in advance based on the information about the firmware of the IoT device.

For example, reverse engineering analysis is performed on the information about the firmware of the IoT device, whereby the location of the exception handler in the firmware memory of the IoT device may be identified.

Based on the identified location of the exception handler, exception handling executed in response to a crash in the IoT device may be hooked.

Generally, firmware of an IoT device may be designed to, when a crash occurs due to a problem or error in the IoT device, recognize the crash and perform its own exception handling. In the present invention, exception handling internally performed in the IoT device is intercepted, whereby a fuzzing process may be performed.

Particularly, an IoT device or an ICS device is designed such that, when a crash occurs, the device recovers the functions thereof by being initialized as soon as possible in order to sustain the operation for achieving the first intended purpose, and information for processing the same is defined in an exception table.

For example, in preparation for various interrupts capable of occurring in an IoT device, the operation to be performed in response to the occurrence of an interrupt may be previously defined in the exception table.

Accordingly, the present invention may hook an interrupt corresponding to a crash, among the multiple interrupts defined in the exception table.

That is, general exception handling may be designed to actually perform initialization for system function recovery when it is determined that a crash occurs in a system, and in this process, the present invention hooks an interrupt, whereby fuzzing data may be collected before the system is reset.

Here, the fuzzing agent may deliver the collected fuzzing data to the apparatus for automated fuzzing for an IoT device.

Here, the fuzzing data may include at least one of crash occurrence information and the value of a register of CPU architecture used in the IoT device during execution of exception handling.

For example, referring to FIGS. 5 to 6, an arbitrary process is generated in a device that uses VxWorks OS, and the register value 510 used during execution of the corresponding process may be checked by searching a specific area of memory.

Particularly in the corresponding memory, functions of each register may be checked using information provided by VxWorks OS.

For example, a program counter contains information about the location in a program currently being executed, and using the same, the location at which a crash occurs in the program may be identified.

Also, when no crash occurs in the IoT device, the processor 1120 may continuously monitor the processing status of the IoT device until automated fuzzing for the IoT device is terminated.

Also, the processor 1120 resets the IoT device based on the fuzzing agent.

Here, fuzzing for the IoT device may be repeatedly performed in an automated manner by resetting the IoT device.

For example, when the reset of the IoT device is completed, the apparatus for automated fuzzing for an IoT device inputs new fuzzing input, which is different from the previous fuzzing input, into the IoT device based on the fuzzing agent and repeats the above-described fuzzing process, thereby continually performing automated fuzzing for the IoT device.

Hereinafter, the process of performing fuzzing for an IoT device using a fuzzing agent according to an embodiment of the present invention will be described in detail with reference to FIGS. 7 to 8.

First, referring to FIG. 7, the apparatus 710 for automated fuzzing for an IoT device according to an embodiment of the present invention may upload a fuzzing agent 720 into an IoT device using an agent upload function.

The fuzzing agent 720, which is uploaded into the IoT device, monitors the status of processing of fuzzing input by the IoT device at step S810, thereby determining whether a crash occurs at step S815.

When it is determined at step S815 that no crash occurs, monitoring may be repeatedly performed until fuzzing for the IoT device is completed.

Also, when it is determined at step S815 that a crash occurs, the value of a register of CPU architecture that is used during execution of exception handling for responding to the occurrence of the crash in the IoT device may be collected at step S820 based on the register value read function of the fuzzing agent, illustrated in FIG. 7.

Here, the fuzzing agent reads from a register for an instruction pointer (IP) that points to the current instruction being executed in the IoT device, thereby detecting the location at which the crash occurs.

Then, the fuzzing agent may deliver fuzzing data to the apparatus 710 for automated fuzzing for an IoT device at step S830 based on the register value transmission function illustrated in FIG. 7.

Here, the fuzzing data may be delivered over a network, and may include the value of the register, crash occurrence information, the location at which the crash occurs, and the like.

Then, the fuzzing agent may reset the IoT device at step S840 based on the reset function illustrated in FIG. 7 in order to repeatedly perform fuzzing.

The memory 1130 stores fuzzing data.

Also, the memory 1130 may store various kinds of information generated during the above-described process for automated fuzzing for an IoT device.

According to an embodiment, the memory 1030 may be separate from the apparatus for automated fuzzing for an IoT device, and may support the function of automated fuzzing for an IoT device. Here, the memory 1030 may operate as separate mass storage, and may include a control function for performing operations.

Using the above-described apparatus for automated fuzzing for an IoT device, automated fuzzing technology for an IoT device operating based on firmware may be provided.

Also, there may be provided technology for automatically performing a fuzzing function capable of detecting the occurrence of a crash by monitoring an IoT device, collecting and delivering information related to the occurrence of the crash, and initializing (resetting) the IoT device.

Also, a vulnerability in an IoT device may be detected early based on automated fuzzing such that it is possible to respond thereto, whereby an environment in which the IoT device can be used more securely may be constructed.

According to the present invention, automated fuzzing technology for an IoT device that operates based on firmware may be provided.

Also, the present invention may provide technology for automatically performing a fuzzing function capable of detecting the occurrence of a crash by monitoring an IoT device, collecting and delivering information related to the occurrence of the crash, and initializing (resetting) the IoT device.

Also, the present invention enables response to a vulnerability in an IoT device by detecting the same early based on automated fuzzing, thereby constructing an environment in which the IoT device can be used more securely.

As described above, the method for automated fuzzing for an IoT device based on automated reset and the apparatus using the same according to the present invention are not limitedly applied to the configurations and operations of the above-described embodiments, but all or some of the embodiments may be selectively combined and configured, so the embodiments may be modified in various ways.

What is claimed is:

1. A method for automated fuzzing for an IoT device, comprising:
   loading, by an apparatus for automated fuzzing for the IoT device, a fuzzing agent into the IoT device based on firmware;
   monitoring, by the apparatus for automated fuzzing for the IoT device, a status of processing of fuzzing input by the IoT device based on the fuzzing agent;
   collecting, by the apparatus for automated fuzzing for the IoT device, fuzzing data corresponding to occurrence of a crash based on hooking using the fuzzing agent when the crash occurs in the IoT device; and
   resetting, by the apparatus for automated fuzzing for the IoT device, the IoT device based on the fuzzing agent.

2. The method of claim 1, wherein collecting the fuzzing data comprises:
   is detecting, in advance, a location of an exception handler of the IoT device in firmware memory based on firmware information of the IoT device; and
   hooking exception handling executed in response to the crash in the IoT device based on the location of the exception handler.

3. The method of claim 2, wherein hooking the exception handling is configured to hook an interrupt corresponding to the crash, among multiple interrupts defined in an exception table.

4. The method of claim 2, wherein the fuzzing data includes at least one of crash occurrence information and a value of a register of CPU architecture that is used in the IoT device during execution of the exception handling.

5. The method of claim 2, wherein the fuzzing agent is loaded into an available space that is not used in the firmware memory.

6. The method of claim 1, wherein the fuzzing agent is in a form of a binary file compiled appropriately for CPU architecture on which the firmware of the IoT device is run.

7. The method of claim 2, wherein the fuzzing agent is loaded based on at least one of an interface accessible to the firmware memory and a debug port of the IoT device.

8. The method of claim 2, wherein the firmware information is collected based on at least one of information published by a manufacturer of the IoT device and debugging data of the IoT device.

9. The method of claim 1, wherein the crash corresponds to a situation in which the firmware of the IoT device is not capable of running normally.

10. An apparatus for automated fuzzing for an IoT device, comprising:
    a processor for loading a fuzzing agent into the IoT device based on firmware, monitoring a status of processing of fuzzing input by the IoT device based on the fuzzing agent, collecting fuzzing data corresponding to occurrence of a crash based on hooking using the fuzzing agent when the crash occurs in the IoT device, and resetting the IoT device based on the fuzzing agent; and
    memory for storing the fuzzing data.

11. The apparatus of claim 10, wherein the processor detects, in advance, a location of an exception handler of the IoT device in firmware memory based on firmware information of the IoT device and hooks exception handling executed in response to the crash in the IoT device based on the location of the exception handler.

12. The apparatus of claim 11, wherein the processor hooks an interrupt corresponding to the crash, among multiple interrupts defined in an exception table.

13. The apparatus of claim 11, wherein the fuzzing data includes at least one of crash occurrence information and a value of a register of CPU architecture that is used in the IoT device during execution of the exception handling.

14. The apparatus of claim 11, wherein the fuzzing agent is loaded into an available space that is not used in the firmware memory.

15. The apparatus of claim 10, wherein the fuzzing agent is in a form of a binary file compiled appropriately for CPU architecture on which the firmware of the IoT device is run.

16. The apparatus of claim 11, wherein the fuzzing agent is loaded based on at least one of an interface accessible to the firmware memory and a debug port of the IoT device.

17. The apparatus of claim 11, wherein the firmware information is collected based on at least one of information published by a manufacturer of the IoT device and debugging data of the IoT device.

18. The method of claim 10, wherein the crash corresponds to a situation in which the firmware of the IoT device is not capable of running normally.

\* \* \* \* \*